US009535643B2

(12) United States Patent
Waller et al.

(10) Patent No.: US 9,535,643 B2
(45) Date of Patent: Jan. 3, 2017

(54) MOBILE PHONE USER INTERFACES FOR A PRINT SERVER THAT ARE GENERATED BASED ON PRINTER STATUS INFORMATION

(75) Inventors: Marquis G. Waller, Beverly, OH (US); Jung Yi, Longmont, CO (US); Daria Tolmacheva, Aurora, CO (US); Norris Xu, Superior, CO (US)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 13/525,651

(22) Filed: Jun. 18, 2012

(65) Prior Publication Data

US 2013/0335772 A1   Dec. 19, 2013

(51) Int. Cl.
| | |
|---|---|
| *G06K 15/02* | (2006.01) |
| *G06F 3/12* | (2006.01) |
| *H04N 1/00* | (2006.01) |
| *H04N 1/32* | (2006.01) |

(52) U.S. Cl.
CPC ......... *G06F 3/1292* (2013.01); *G06F 3/1204* (2013.01); *G06F 3/1229* (2013.01); *G06F 3/1253* (2013.01); *G06F 3/1259* (2013.01); *G06F 3/1288* (2013.01); *H04N 1/00244* (2013.01); *H04N 1/00307* (2013.01); *H04N 1/00477* (2013.01); *H04N 1/32106* (2013.01); *H04N 1/32523* (2013.01); *H04N 1/00233* (2013.01); *H04N 1/00344* (2013.01); *H04N 2201/0082* (2013.01); *H04N 2201/3204* (2013.01); *H04N 2201/3205* (2013.01); *H04N 2201/3219* (2013.01); *H04N 2201/3273* (2013.01); *H04N 2201/3278* (2013.01)

(58) Field of Classification Search
None
See application file for complete search history.

(56) References Cited

U.S. PATENT DOCUMENTS

| | | | |
|---|---|---|---|
| 6,288,790 B1 | 9/2001 | Yellepeddy et al. | |
| 7,953,818 B2 | 5/2011 | Chang et al. | |
| 8,189,225 B1 * | 5/2012 | Lo ........................... | G06F 3/122 |
| | | | 358/1.15 |

(Continued)

OTHER PUBLICATIONS

"DocPrinter with server browsing Review," Retrieved from http://www.macworld.com/appguide/app.html?id=287435&expand=false on Sep. 27, 2011.

*Primary Examiner* — Vincent Rudolph
*Assistant Examiner* — Marchelle L Taggart
(74) *Attorney, Agent, or Firm* — Duft Bornsen & Fettig LLP

(57) ABSTRACT

Systems and methods are provided for interactions between print servers and mobile phones. One embodiment is a mobile phone comprising a memory, a transceiver, and a control unit. The memory is operable to store rules for interacting with printers, and the transceiver is operable to communicate with a wireless telecommunication network via radio frequency transmissions. The control unit is operable to receive a notification from a print server via the transceiver that indicates status information for a printer controlled by the print server, to determine actions available for the printer based on the stored rules and the status information, and to generate a Graphical User Interface (GUI) that displays interactive graphical elements selectable by a user to initiate the available actions for the printer.

15 Claims, 7 Drawing Sheets

(56) References Cited

U.S. PATENT DOCUMENTS

| | | | |
|---|---|---|---|
| 8,482,767 B2* | 7/2013 | Greene | G06F 3/1288 |
| | | | 358/1.14 |
| 2006/0080384 A1 | 4/2006 | Robinson et al. | |
| 2006/0181730 A1 | 8/2006 | Moore | |
| 2007/0124436 A1* | 5/2007 | Shepherd | G06F 3/1226 |
| | | | 709/223 |
| 2009/0009802 A1 | 1/2009 | Shaw et al. | |
| 2009/0103124 A1 | 4/2009 | Kimura et al. | |
| 2011/0058213 A1 | 3/2011 | Waller et al. | |
| 2011/0075200 A1* | 3/2011 | Goldwater | G06F 3/1205 |
| | | | 358/1.15 |

* cited by examiner

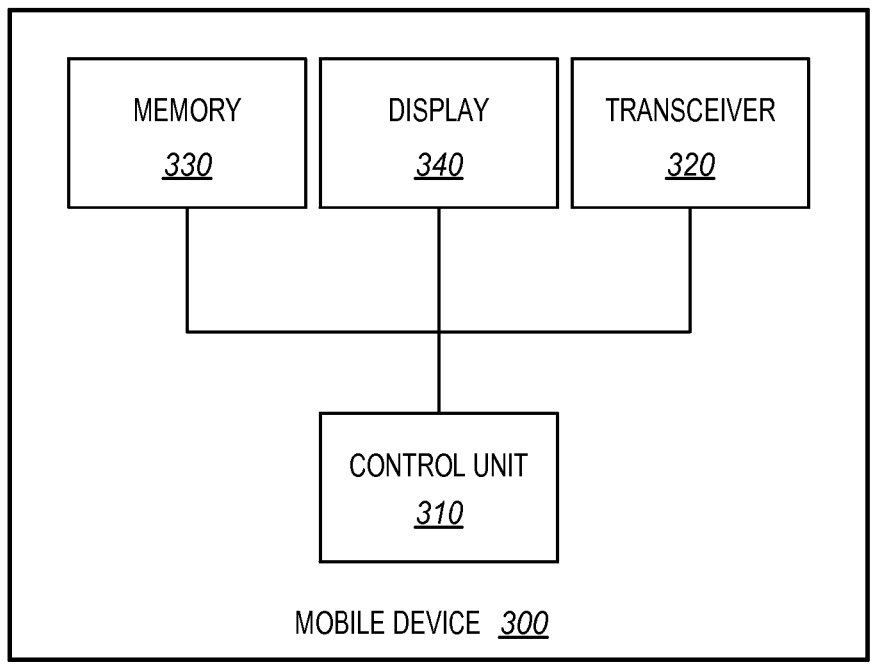

MOBILE PHONE USER INTERFACES FOR A PRINT SERVER THAT ARE GENERATED BASED ON PRINTER STATUS INFORMATION

FIELD OF THE INVENTION

The invention relates to the field of printing, and in particular, to interacting with a print server via a mobile phone.

BACKGROUND

In the field of production printing systems, large print jobs may include many pages and may take weeks to print. Because of this, print shop operators tend to use print servers, such as those utilizing Infoprint ProcessDirector (IPPD) software, in order to coordinate and schedule the actions of various printers at the shop and also to account for the complexities of high-volume printing. Because print server software can often be complex, it is not generally intuitive to use. Because of this, only a small fraction of operators of the print shop may be skilled in the use of the print server software. This can create a problem, as when a skilled operator has left the print shop (e.g., for vacation, for the night, etc.), the remaining print shop operators may be unable to schedule new jobs or otherwise interact with the printers without impacting the intended print production schedule.

Because of this, print shop operators continue to look for improved ways to interact with print servers. Additionally, print shop operators desire ways to interact with print servers even while they are off-site and away from the print shop.

SUMMARY

Embodiments described herein provide systems and methods for interacting with a print server via a mobile phone (e.g., a cellular phone, smart phone, etc.). For example, a mobile phone can receive printing status information for one or more printers managed by a print server. The mobile phone can review the status of the printers, and determine a variety of actions that may be performed to interact with the printers based upon the received status information. The mobile phone may then create a customized user interface that includes selectable graphical elements for triggering the actions. In another example, a print server is capable of registering various mobile phones in memory. The print server can then monitor its printers for changes in printing status, and on a regular basis may provide this status information back to the registered mobile phones via a Multipurpose Internet Mail Extensions (MIME) formatted message to indicate the changed status.

One embodiment is a mobile phone comprising a memory, a transceiver, and a control unit. The memory is operable to store rules for interacting with printers, and the transceiver is operable to communicate with a wireless telecommunication network via radio frequency transmissions. The control unit is operable to receive a notification from a print server via the transceiver that indicates status information for a printer controlled by the print server, to determine actions available for the printer based on the stored rules and the status information, and to generate a Graphical User Interface (GUI) that displays interactive graphical elements selectable by a user to initiate the available actions for the printer.

Another embodiment is a method. The method comprises receiving, at a transceiver of a mobile phone, radio frequency transmissions of a wireless telecommunication network defining a notification from a print server that indicates status information for a printer controlled by the print server. The method also comprises determining, at the mobile phone, actions available for the printer based on the status information and rules for interacting with printers that are stored at a memory of the mobile phone. Further, the method comprises generating a Graphical User Interface (GUI) that displays interactive graphical elements selectable by a user to initiate the available actions for the printer.

Another embodiment is a print server. The print server comprises a network interface, a memory, and a control unit. The network interface is operable to communicate with mobile phones accessible via wireless telecommunication networks. The memory is operable to store contact information for at least one registered mobile phone. The control unit is operable to manage the operations of multiple printers, and on a uniform basis, to review the status of the multiple printers and to transmit Multipurpose Internet Mail Extensions (MIME) format messages having information that indicates the status of the printers to the registered mobile phones via the network interface.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 3 is a block diagram illustrating a mobile phone an exemplary embodiment.

FIG. 4 is a block diagram illustrating printing status information received from a print server in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
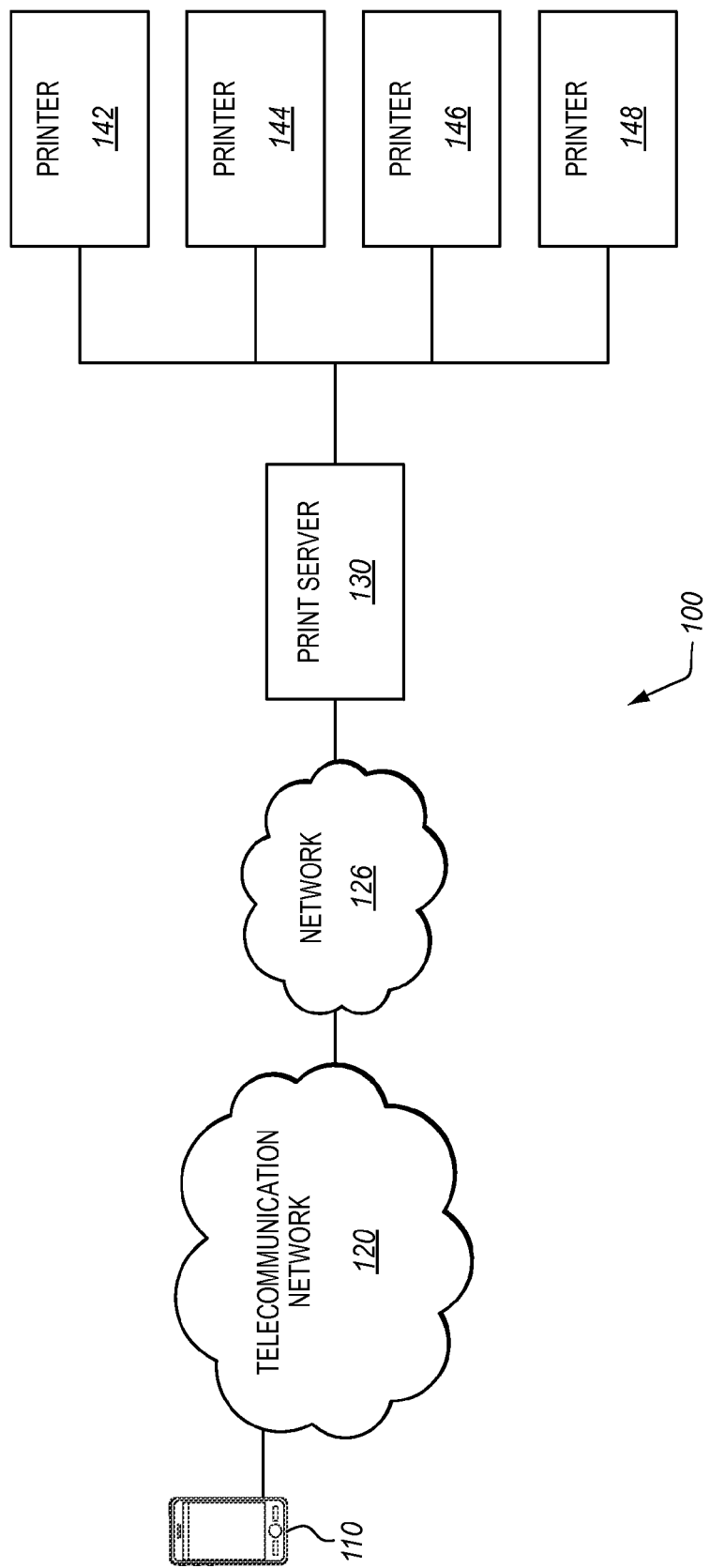
FIG. 1 is a block diagram of a system in an exemplary embodiment.

FIG. 1 is a block diagram of a system 100 in an exemplary embodiment. System 100 comprises any combination of networks, protocols, components, and devices operable to enable a mobile phone (e.g., cellular phone, smartphone, etc.) to interact with a print server to manage the production of printed documents. According to FIG. 1, system 100 comprises a number of devices and networks. Specifically, system 100 includes mobile phone 110, telecommunication (telecom) network 120, network 126, print server 130, and printers 142-148.

Mobile phone 110 comprises any system, component, or device operable to receive and provide messages over a Radio Access Network (RAN) of telecom network 120 that are encoded according to a telecommunication signaling protocol (e.g., SIP, ISUP, MAP, etc.). For example, mobile phone 110 may be a phone registered on a 3G or 4G mobile telecom network. Mobile phone 110 may send telecommunication protocol messages to and from base stations of telecom network 120, which may be coupled with a core network of telecom network 120. The core network may then route, translate, and/or unpackage messages received from mobile phone 110 into a format for transmission over the Internet. Telecom messages include voice and text messages defined according to the telecommunication signaling protocols discussed above.

Mobile phone 110 has been enhanced to communicate with a print server via telecom network 120. For example, mobile phone 110 may include a touchscreen or other interface component to generate commands for print server 130 that are transmitted across telecom network 120 using telecom protocols. Mobile phone 110 includes, for example, a processor, internal memory, a transceiver, and other components for operating to carry and provide telecom messages to different elements of telecom network 120.

Telecom network 120 may comprise any combination of systems and components that utilize telecommunication signaling protocols for managing communications for mobile phones operated by subscribers of telecom network 120. For example, telecom network 120 may include a packet-switched core network connected to a plurality of base stations forming a RAN. In such an example, telecom network 120 may comprise an LTE network, where the packet-switched core network comprises an EPC network and base stations comprise eNodeBs. Each base station may form one or more cells within telecom network 120. A cell represents a coverage area where mobile phones are able to exchange wireless signals with a base station. Telecom network 120 may include other network elements that are not shown for the sake of brevity.

Telecom network 120 may exchange communications with mobile phones of various subscribers via the airwaves. For example, a RAN of telecom network 120 may comprise elements that are compliant with 3G or 4G standards issued by the International Telecommunication Union (ITU). Typically, telecom network 120 will include base stations operable to communicate with mobile phone 110 via a telecom protocol supported by mobile phone 110, and will further include servers and other components used to access devices and networks (e.g., the Internet) that are external to telecom network 120.

Network 126 comprises any network by which print server 130 is available. For example, network 126 may comprise the global Internet, may comprise an in-house intranet, etc. Network 126 comprises elements linking telecom network 120 to print server 130. As such network 126 may comprise components owned by a "backbone" Internet services provider (such as fiber optic cables, large-scale switching hardware, etc.), and may further comprise network components owned by a print shop operator (such as in-house routers, switches, etc.).

Print server 130 comprises any system, component, or device operable to manage the operations of printers 142-148. For example, print server 130 may be operable to schedule print jobs for printing, cancel print jobs, query printers to determine their status, detect error conditions at printers (e.g., processing errors, a lack of media or marking material, etc.), and perform other printing related tasks to manage the print shop. In this embodiment, print server 130 comprises a hardware processor or custom circuit implementing logic stored in a memory. The combination of these components of print server 130 may be referred to as the "control unit" for print server 130. Print server 130 may further comprise network interfaces and other components utilized to facilitate communication with external devices.

Printers 142-148 comprise any systems, components, or devices operable to apply marks to a printing media such as paper. For example, each of printers 142-148 include one or more marking engines operable to apply marks to the media, and may further include print controllers for receiving and rasterizing print data from print server 130. The marking engines may use ink, toner, or other marking materials to mark the media, or may even emboss, stamp, burn or cut the media to apply marks upon it.

System 100 has been enhanced in order to provide a number of options for interacting with mobile phones. In one embodiment, each mobile phone of system 100 may be enhanced in order to dynamically generate customized user interfaces based upon printing status information received from print server 130. For example, a mobile phone 110 may determine that a printer is currently in an error condition. Based upon this, the mobile phone 110 may generate a customized interface for the user indicating the ways that a user may interact with the printer via print server 130.

In a further embodiment, system 100 may allow a number of mobile phones 110 to register with print server 130. Print server 130 may then monitor the status of printers 142-148, and may regularly update each registered mobile phone 110 of the current status of printers 142-148 via network 126 and telecom network 120. In this manner, a user at a mobile phone 110 may receive updates that have been "pushed" from print server 130 without needing to constantly query print server 130 for status updates.

Further details of the operation of system 100 will be discussed with regard to FIG. 2. Assume, for this embodiment, that a user of a mobile phone 110 wishes to review and manage print jobs currently scheduled via print server 130. To that end, the user activates an application ("app") on mobile phone 110 and attempts to contact print server 130. Mobile phone 110 may send a request to print server 130 via telecom network 120. The request sent through the transceiver traverses telecom network 120 and is processed by network 126 in order to arrive at print server 130.

Figure 2:
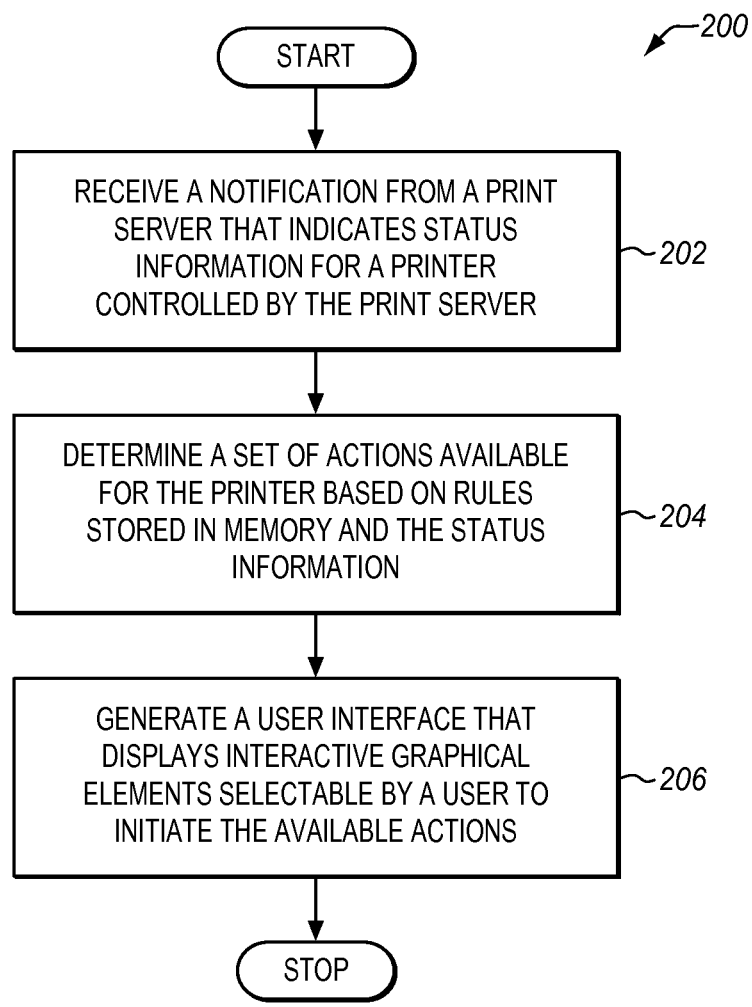
FIG. 2 is a flowchart illustrating a method for generating custom user interfaces for a mobile phone in an exemplary embodiment.

FIG. 2 is a flowchart illustrating a method 200 for generating custom user interfaces for a mobile phone in an exemplary embodiment. The steps of method 200 are described with reference to system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, mobile phone 110 receives a notification from print server 130 that indicates status information for one or more printers controller by print server 130. This notification may, for example, be in response to a request sent to print server 130 as described above. The notification, initiated by print server 130, indicates printing status information for a printer controlled by print server 130. This printing status information will typically comprise information indicating whether the printer is idle, has jobs in a queue, is currently printing, has encountered an error condition, etc. The status information may further include information indicating the name, make, and model of the printer, the name and number of jobs scheduled at the printer, the expected source of an error at the printer, an indication of how to solve an error encountered at the printer, and any other information suitable to facilitating management of the printer. Typically, printing status information will be received for the entire batch of printers managed by print server 130 all at once, although in some embodiments print server 130 may transmit status information for individual printers, or for only a subset of printers. For example, if a user of mobile phone 110 only has permission to view/manipulate a single printer via print server 130, they may receive status information for that printer (and not the others).

Based upon the received notification, mobile phone 110 may generate a user interface that displays the list of printers currently managed by print server 130. This interface may also indicate a status for each printer. The user may then provide input selecting a desired printer for viewing and interaction. The user input may be provided, for example, via a touchscreen display, audio selection, keypad, etc.

In step 204, mobile phone 110 determines a set of actions available for the printer based upon the printing status information and rules stored in memory for interacting with printers. For example, mobile phone 110 may acquire a name for the status of the printer (e.g., "error," "printing," "idle") by reviewing the status information. From this point, mobile phone 110 may review a database stored in memory to find an entry for the named status. The entry includes information indicating which actions are available for printers having that status. The available actions for each status may vary depending on permissions for the user, the make and model of the printer, and other factors. The entries may be categorized by any criteria. The actions determined by mobile phone 110 will vary depending on the printer's status, but common actions typically include adding a print job to a queue for the printer, removing a print job from a queue for the printer, halting all printing at the printer, changing a setting for a print job scheduled at the printer, resuming printing at the printer, and other various interactions known to those of ordinary skill in the art.

In step 206, mobile phone 110 generates a Graphical User Interface (GUI) that comprises interactive graphical elements. The interactive graphical elements are selected based upon the determined available actions, and may be used to initiate the available actions. For example, some interactive graphical elements may trigger an available action, while other graphical elements may define or otherwise select desired parameters for an available action. The interactive graphical elements may comprise, for example, drop-down menus, buttons, dials, lists, check boxes, number fields, text fields, and other user interface components. The type, nature, and number of controls used for initiating each action may vary depending upon the complexity of the action. The nature and number of the various interactive graphical elements displayed via the GUI will of course vary depending upon the status of the printer. Typically, the user interface will be rendered as a "page" of graphical content, and this page may be acquired/selected from memory or generated "on the fly" by mobile phone 110.

In one example, mobile phone 110 may position and/or size each graphical element based upon the number and type of actions that are available. For example, if a large number of actions are available, the size of the buttons, drop-down menus, text and other features may be scaled down. In another example, the location of each graphical element within the screen depends upon where other graphical elements are placed. In such an example, graphical elements for one type of interaction (e.g., adding or scheduling jobs) may be placed in one part of the interface, while graphical elements for other types of interactions (e.g., viewing individual jobs scheduled at the printer) may be placed at another part of the interface. In another embodiment, actions that are deemed "high priority" are placed at the top of the user interface, with other actions placed below. For example, stopping printing at a printer could be considered a high priority action, while viewing a print job might be considered a low priority action. In a still further embodiment, graphical elements for actions that are considered common actions (such as viewing the queue of print jobs for the printer) are placed in prominent locations, while graphical elements for uncommon actions (such as halting all printing at the printer) are placed at less prominent locations at the screen. Thus, if a printer is in an "error" condition, actions initiated by the interface may include diagnostic options (e.g., a button to receive a detailed error report indicating the time the error was encountered, the type of error that was encountered, etc.), options to schedule interrupted jobs at other printers, and options to attempt to resume printing in spite of the detected error.

Thus, using the method of FIG. 2, a mobile phone may beneficially generate user interfaces "on the fly" without relying on print server 130 to provide a user interface. This provides a number of advantages over the prior art. First, only status information is provided, instead of an entire interface for interacting with the printer (which would include data heavy features such as images, entire web pages, etc.). This is particularly useful when the printer status information is included within a very low bandwidth communication. Second, such techniques allow mobile phone 110 to utilize its own internal code to generate user interfaces, which allows the user interfaces to exhibit greater flexibility and interactivity than a universally defined format (such as a web page) provides. For example, an internally generated mobile phone interface may provide enhanced touchscreen integration when compared to a web page that is displayed via the phone.

FIGS. 3-4 provide further details of mobile phones and printer status information that may be utilized in an exemplary embodiment. FIG. 3 is a block diagram illustrating a mobile phone 300 an exemplary embodiment. According to FIG. 3, mobile phone 300 includes control unit 310, transceiver 320, memory 330, and display 340. Control unit 310 may comprise, for example, a hardware processor implementing instructions for processing data at mobile phone 300. Control unit 310 manages the operations of transceiver 320 in communicating with a wireless radio network, and may access and/or manipulate memory 330 while generating user interfaces. In one embodiment, control unit 310 is used for more than just managing user interfaces, and may, for example, manage each of the processing operations of mobile phone 300. This would make control unit 310 the central processing unit of mobile phone 300. User interfaces generated by control unit 310 may be displayed via display 340, which may comprise a screen, touchscreen or other display device.

FIG. 4 is a block diagram illustrating printing status information 400 received from a print server in an exemplary embodiment. In this embodiment, status information 400 indicates a number of variables for each printer. Status information 400 indicates whether each printer is currently printing, idle, or in an error condition. Status information 400 further indicates which job is currently being processed by the printer, as well as which jobs are in a queue for the printer. Further, status information 400 includes information indicating the capabilities of each printer. These capabilities may indicate whether the printer is color or black and white, may indicate post-processing that can be performed at the printer (e.g., hole-punching, stapling, binding, etc.), and may further indicate any other relevant information describing system 100.

Figure 5:
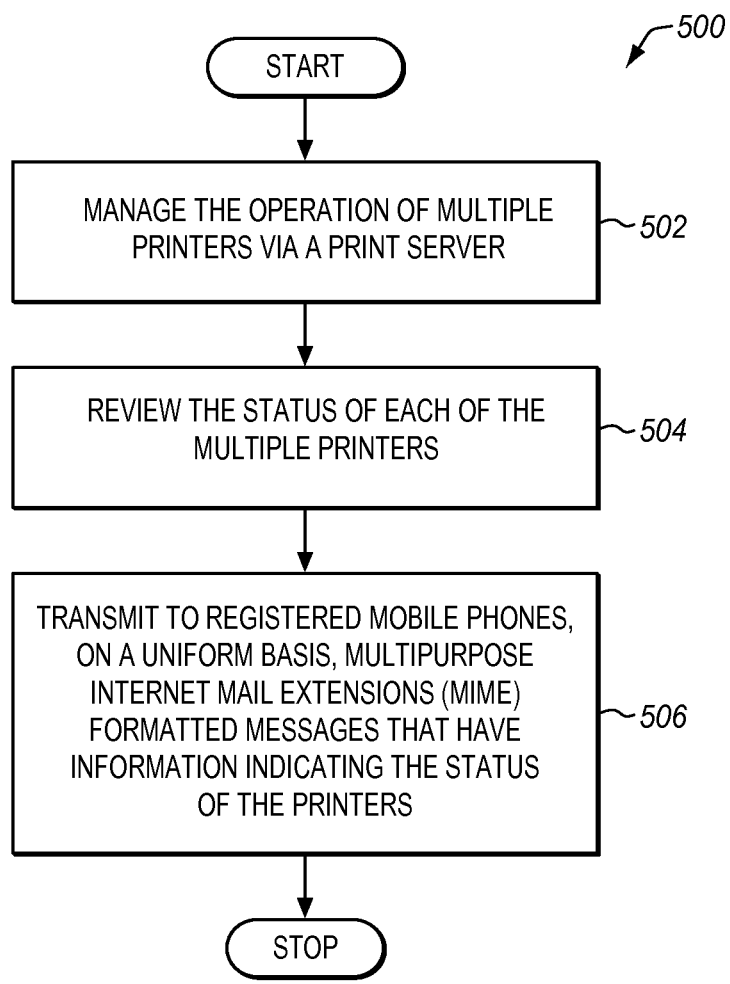
FIG. 5 is a flowchart illustrating a method of enhanced processing at a print server.

FIG. 5 is a flowchart illustrating a method 500 of enhanced processing at a print server such as print server 130 described above. According to FIG. 5 in step 502, print server 130 manages the operations of multiple printers. This may include, for example, scheduling jobs for processing of the printers, managing printing parameters for those printers, etc. Step 504 comprises reviewing the status of the multiple printers. This may include, for example, contacting the printers via a communication channel and directly querying the printers for status information.

In step 506, printer server 130 transmits, on a uniform basis, Multipurpose Internet Mail Extensions (MIME) format messages having information that indicates the status of the printers to the registered mobile phones via the network interface. These messages may then be regularly sent out to registered devices so that users of those devices become aware of changes to the system. For example, indications of status changes may be sent out on a periodic basis, such as every minute, every five minutes, every day, etc. In another example, a change in status may be always indicated to registered devices if the change indicates an error. In yet another example, every set of five changes to the printing system may be provided to the registered devices. The changes in status may be indicated via, for example, messages formatted according to standards for Multipurpose Internet Mail Extensions (MIME). These changes in status may be received by the various mobile phones and then stored in memory or otherwise processed.

In further examples, registration requests received at the print server include parameters indicating what types of changes the user wishes to be notified of, and what printers the user would like to be notified of changes for. The registration requests may further describe how often and in what manner to notify the device of the changes in status.

EXAMPLES

In the following examples, additional processes, systems, and methods are described in the context of a printing system that allows mobile devices to interact with it. Assume, for this embodiment, that a user of a mobile phone (e.g., a smart phone, cellular phone, etc.) wishes to review the printers managed by a print server.

In this example, the user activates an application ("app") residing on their phone. The app initiates by providing a login screen that requests a user name and password, which the user submits. The user name and password are acquired by the app. The app then generates a request based on the login information, and instructs the phone to transmit the request to an Infoprint ProcessDirector (IPPD) print server at a predefined Internet Protocol (IP) address. The phone then utilizes its transceiver to send the request to a port of the server at the IP address. The server, upon receiving the login information, checks to see whether the login information is valid. If so, the print server generates a list of printers and print jobs at the print server, and transmits this information to the phone for display.

Additionally, the server registers the phone within a list for devices that should be notified if changes occur at the printing system. This registration may include storing an IP address for the phone, an e-mail address for the user of the phone, or any suitable communication channel which may be accessed by the app of the phone to receive status updates. From this point forward, changes in the system (to the printers and/or the print jobs scheduled at the printers) may be logged at the server and transmitted to the mobile phones.

With the registration system in place and the current system status received, the phone generates a list indicating the progression of various print jobs throughout the printing system. A user may then browse the list, and focus on individual print jobs and/or printers. Each time a printer is selected, the phone reviews a status of the printer. Based on the printer's status and the rules stored in memory, the phone generates a list of actions that can be performed for the printer. This list of actions is not received from the print server, but rather is internally generated by the phone. For example, a printer having an error might not allow a user to schedule more print jobs on the printer, while a printer which is currently printing may allow a user to schedule more jobs. Based upon this list of actions, the phone selects a set of user interface components, and assembles a user interface that includes components for each of the actions.

For example, the components for adding a print job to a queue for a printer may include a button, a "browse" menu allowing a user to select a print job, and a drop-down menu indicating where the user would like to place the job within the queue for the printer. If a user selects a print job queued for processing at the printer, the app generates a report indicating further information about the job, such as an estimated completion time, the total number of pages in the job, whether the job is color or black and white, and other information. If this information is already stored in memory at the phone, then it may be simply provided whenever a user requests it by reviewing the status information stored in memory. However, if the information is not already known to the phone, then further communications may be performed with the print server in order to acquire these details.

Naturally, on-screen "real estate" on a phone is fairly small and is in high demand. Furthermore, commands for print servers tend to have a very large number of parameters that can be tailored. To balance these competing aspects, the app may make certain default assumptions about command parameters. These assumptions may be contextual assumptions that are based upon the status of the printer and other factors. For example, if the user is currently in a user interface for "Printer A," the "add jobs" button will naturally add the jobs to printer A without querying which printer to add the jobs to. Other similar default settings may be used (e.g., always add a print job to the back of a queue, only print one copy of an added job, etc.) in order to streamline the user experience. Thus, if a user wishes to generate the command, the command, as transmitted to the print server, includes all of the default settings. The user is therefore not forced to review a variety of settings for an action that are likely to be irrelevant.

Thus, using the system described above, interactions between a mobile phone and a print server may be streamlined in a manner that is both convenient and effective. This enhances the user experience and also enhances usability of the printing system.

Figure 6:
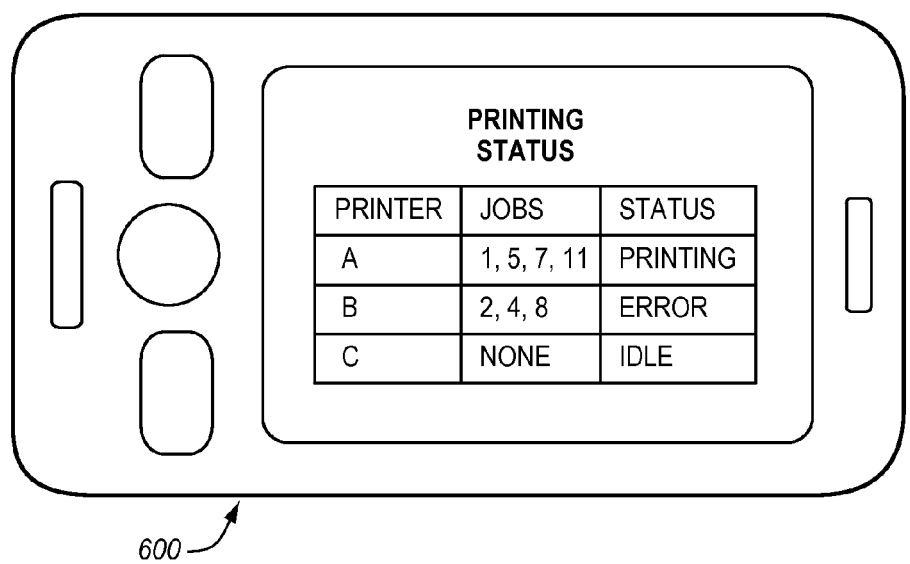
FIGS. 6-9 are block diagrams illustrating custom-generated user interfaces for a mobile phone in an exemplary embodiment.
Figure 7:
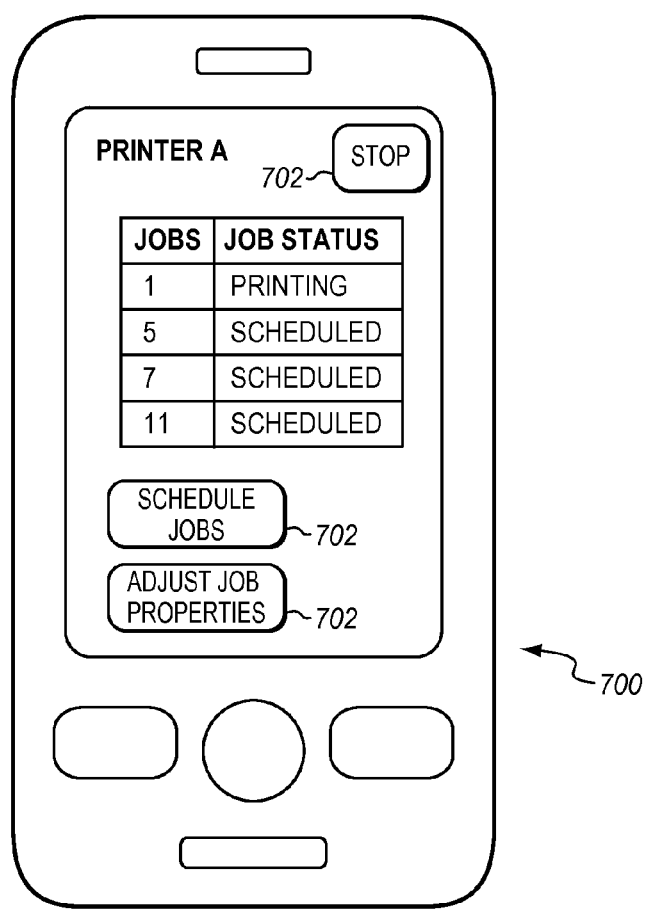

FIGS. 6-9 are block diagrams illustrating custom-generated user interfaces for a mobile phone in an exemplary embodiment. FIG. 6 illustrates an exemplary user interface 600, provided in landscape format, which indicates an overview of printers managed by the printing system. This overview lists each printer, lists jobs scheduled for processing at the printer, and indicates a status for each printer. FIG. 7 illustrates an exemplary user interface 700 generated for a printer. User interface 700 includes graphical elements 702 that have been selected and placed based upon the status of the printer. In this embodiment, the printer's status is indicated as "printing." Thus, graphical elements 702 may trigger a number of actions that relate to the printer. These actions include stopping printing at the printer, adjusting properties (e.g., resolution in dots per inch, ink used, media used) for jobs scheduled at the printer, and scheduling further jobs for printing at the printer. When an action is triggered, a message may be generated at the phone in a Multipurpose Internet Mail Extensions (MIME) format, and this message may be transmitted via a transceiver of the phone. For example, the message may comprise a request directed to an Internet port of the server that directs the server to initiate the action.

Figure 8:
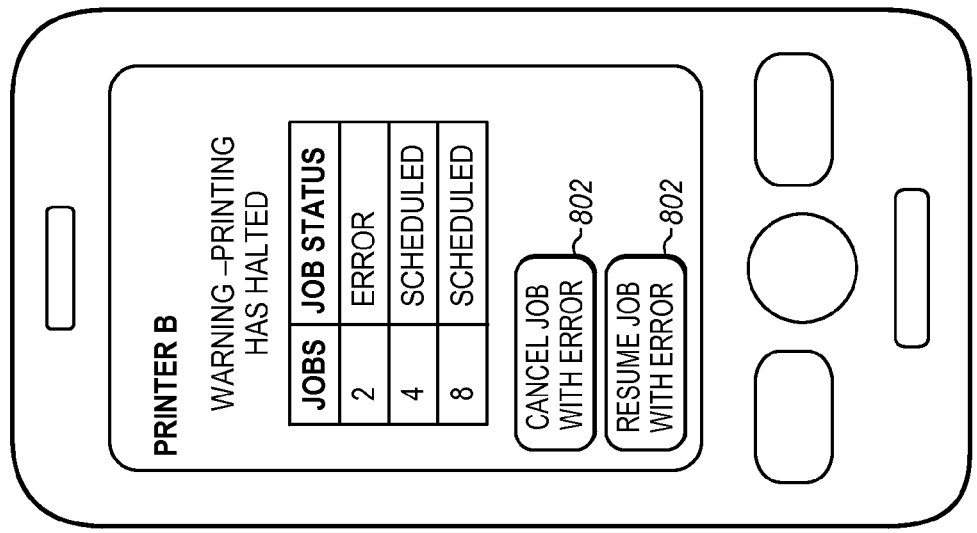

FIG. 8 illustrates an exemplary user interface 800 for interacting with a different printer. In this embodiment, the printer's status is indicated as "error." Thus, the user interface includes a generated warning based on the error condition. Additionally, the user interface includes graphical elements 802 for interacting with the printer. These graphical elements (e.g., controls) allow a user to cancel the print job that encountered the error, or to attempt resuming the job that encountered the error. Resuming the job that encountered the error may be appropriate for situations when the error stems from, for example, the printer running out of media or ink for processing the job.

Figure 9:
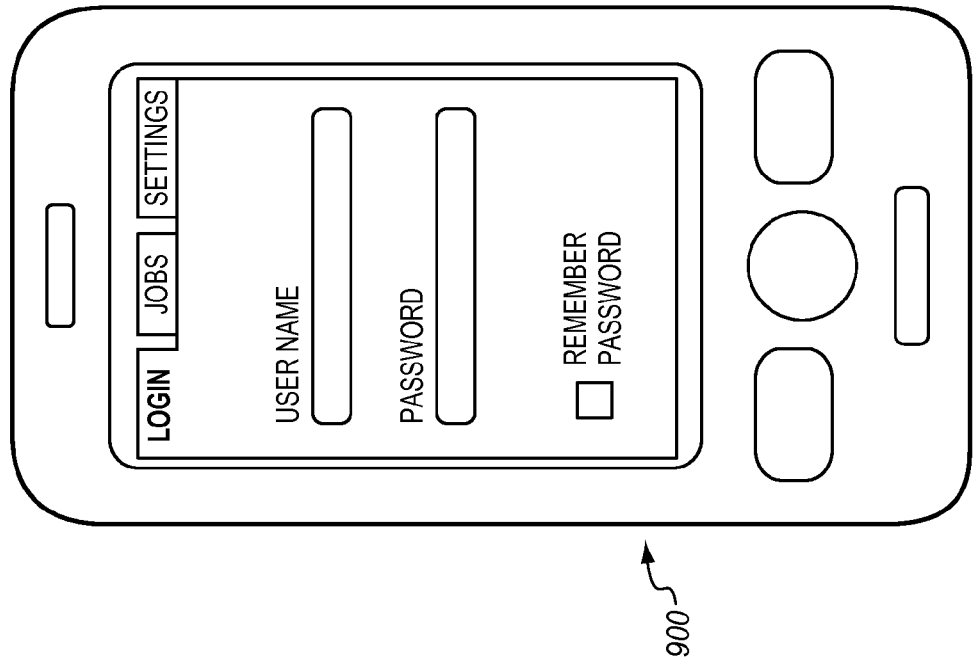

FIG. 9 illustrates a tabbed user interface 900 for a mobile phone in an exemplary embodiment. According to FIG. 9, interface 900 includes several separate screens. The first screen, "login," allows a user to attempt to log into a secure printing server. Note that the printing server may allow for several tiers of access, such that certain users have fewer options for interacting with the server than others. Another screen supported by user interface 900 is a "jobs" screen that lists each job scheduled for printing at the printing system. In this manner, a user may quickly determine where jobs have been scheduled, which jobs have encountered errors, etc. A further screen provided by user interface 900 is a "settings" screen. This may allow the user to customize certain aspects of the user interface to streamline and personalize their experiences in interacting with the print server.

Figure 10:
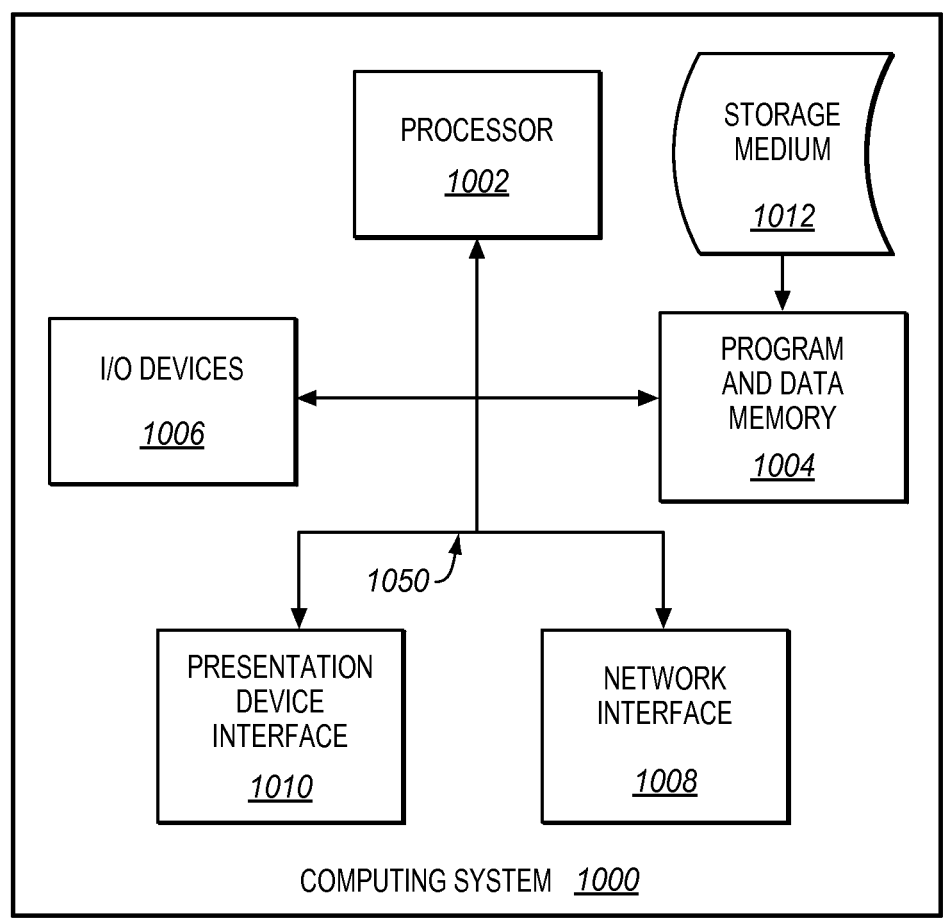
FIG. 10 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of system 100 to perform the various operations disclosed herein. FIG. 10 illustrates a processing system 1000 operable to execute a computer readable medium embodying programmed instructions to perform desired functions in an exemplary embodiment. Processing system 1000 is operable to perform the above operations by executing programmed instructions tangibly embodied on computer readable storage medium 1012. In this regard, embodiments of the invention can take the form of a computer program accessible via computer-readable medium 1012 providing program code for use by a computer or any other instruction execution system. For the purposes of this description, computer readable storage medium 1012 can be anything that can contain or store the program for use by the computer.

Computer readable storage medium 1012 can be an electronic, magnetic, optical, electromagnetic, infrared, or semiconductor device. Examples of computer readable storage medium 1012 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1000, being suitable for storing and/or executing the program code, includes at least one processor 1002 coupled to program and data memory 1004 through a system bus 1050. Program and data memory 1004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1006 (including but not limited to keyboards, displays, pointing devices, etc.) can be coupled either directly or through intervening I/O controllers. Network adapter interfaces 1008 may also be integrated with the system to enable processing system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1010 may be integrated with the system to interface to one or more presentation devices, such as printing systems and displays for presentation of presentation data generated by processor 1002.

Although specific embodiments were described herein, the scope of the invention is not limited to those specific embodiments. The scope of the invention is defined by the following claims and any equivalents thereof.

We claim:

1. A system comprising:
a mobile phone comprising:
a memory operable to store entries for interacting with a printer controlled by a print server, wherein each entry corresponds with a different printing status, and each entry indicates actions for the mobile phone to interact with the printer;
a transceiver operable to communicate with a wireless telecommunication network via radio frequency transmissions; and
a control unit operable to receive a notification from the print server via the transceiver that indicates a printing status of the printer, to consult the entries to determine actions available for the mobile phone to interact with the printer based on the current printing status of the printer, and to independently generate a Graphical User Interface (GUI) that displays interactive graphical elements that are each selectable by a user to initiate one of the available actions for interacting with the printer,
wherein the control unit varies which interactive graphical elements are displayed by the GUI depending on the printing status of the printer, wherein each entry is stored in a database in the memory, is correlated with the printing status, and lists available actions for the printing status, and wherein the printing status is selected from a group comprising printing and error condition.

2. The system of claim 1 wherein:

the control unit is further operable to receive another notification from the print server that indicates a new status of the printer, to determine that the actions available for the printer have changed based on the entries and the new status, and to generate a new GUI that displays new interactive graphical elements that are each selectable by a user to initiate one of the changed actions for the printer.

3. The system of claim 1 wherein:

the available actions vary depending on permissions for the user.

4. The system of claim 1 wherein:

the control unit is further operable to determine a location for each interactive graphical element within the GUI based upon the number of available actions.

5. The system of claim 1 wherein:

the print server comprises an Infoprint ProcessDirector (IPPD) server; and the control unit is further operable to receive user input selecting an interactive graphical element, and to direct the transceiver to transmit a request for initiating an action towards an Internet-accessible port of the IPPD server.

6. The system of claim 1 wherein:

the available actions vary depending on the make and model of the printer.

7. The system of claim 1 wherein:

the control unit is further operable to receive user input selecting an interactive graphical element, and to direct the transceiver to transmit a Multipurpose Internet Mail Extensions (MIME) format request for initiating an action to the print server.

8. The system of claim 1 wherein:

the control unit is further operable to present the GUI at a touchscreen display.

9. A method comprising:

receiving, in a mobile phone, radio frequency transmissions of a wireless telecommunication network defining a notification from a print server that indicates a printing status of a printer controlled by the print server, wherein the mobile phone stores entries for interacting with the printer, each entry corresponds with a different printing status, and each entry indicates actions for the mobile phone to interact with the printer;

consulting the entries to determine actions available for the mobile phone to interact with the printer, based on the current printing status of the printer; and independently generating a Graphical User Interface (GUI) that displays interactive graphical elements that are each selectable by a user to initiate one of the available actions for interacting with the printer; and varying which interactive graphical elements are displayed by the GUI depending on the printing status of the printer, wherein each entry is stored in a database in the memory, is correlated with the printing status, and lists available actions for the printing status, and wherein the printing status is selected from a group comprising printing and error condition.

10. The method of claim 9 further comprising:

receiving another notification from the print server that indicates a new status of the printer;

determining that the actions available for the printer have changed based on the entries and the new status; and generating a new GUI that displays interactive graphical elements that are each selectable by a user to initiate one of the changed actions for the printer.

11. The method of claim 9 wherein:

the available actions vary depending on permissions for the user.

12. The method of claim 9 wherein generating the GUI comprises:

determining a location for each interactive graphical element within the GUI based upon the number of available actions.

13. The method of claim 9 wherein:

the print server comprises an Infoprint ProcessDirector (IPPD) server; and the method further comprises:

receiving user input selecting an interactive graphical element; and directing the transceiver to transmit a request for initiating an action towards an Internet-accessible port of the IPPD server.

14. The method of claim 9 wherein:

the available actions vary depending on the make and model of the printer.

15. The method of claim 9 further comprising:

receiving user input selecting an interactive graphical element; and directing the transceiver to transmit a Multipurpose Internet Mail Extensions (MIME) format request for initiating an action to the print server.

* * * * *